(12) United States Patent
Morais

(10) Patent No.: US 8,422,579 B1
(45) Date of Patent: Apr. 16, 2013

(54) QUADRATURE AMPLITUDE MODULATION VIA MODIFIED-SQUARE SIGNAL POINT CONSTELLATION

(76) Inventor: Douglas Howard Morais, San Mateo, CA (US)

( * ) Notice: Subject to any disclaimer, the term of this patent is extended or adjusted under 35 U.S.C. 154(b) by 0 days.

(21) Appl. No.: 13/547,433

(22) Filed: Jul. 12, 2012

Related U.S. Application Data

(60) Provisional application No. 61/688,124, filed on May 8, 2012.

(51) Int. Cl.
*H04L 5/12* (2006.01)
*H04L 27/28* (2006.01)
*H04L 27/02* (2006.01)
*H04L 27/36* (2006.01)
*H04K 1/10* (2006.01)

(52) U.S. Cl.
USPC ........... 375/261; 375/260; 375/268; 375/298; 375/300; 375/320; 375/345

(58) Field of Classification Search ................... 375/260, 375/261, 268, 298, 300, 320, 345
See application file for complete search history.

(56) References Cited

U.S. PATENT DOCUMENTS 4,683,578 A * 7/1987 Betts et al. .................... 375/345

* cited by examiner

*Primary Examiner* — Shuwang Liu
*Assistant Examiner* — Ross Varndell

(57) ABSTRACT

A square array of signal points forming a $2^{2n}$-QAM signal constellation, where n=3, 4, is modified by relocating the inner most $2^{2n}/16$ and outer $2^{2n}/16$ constellation points to specific positions, resulting a modified-square constellation with a reduced peak to average power ratio (PAPR) at the modulator output relative to that of the square constellation while resulting in a receiver sensitivity that is degraded by less than the decrease in the modulator's PAPR and hence less than the possible improvement at the transmitter in average transmitted power.

6 Claims, 9 Drawing Sheets

US 8,422,579 B1

QUADRATURE AMPLITUDE MODULATION VIA MODIFIED-SQUARE SIGNAL POINT CONSTELLATION

CROSS-REFERENCE TO RELATED APPLICATIONS

This application claims the benefit of my earlier filed Provisional Application No. 61/688,124, filed on May 8, 2012.

STATEMENT REGARDING FEDERALLY SPONSORED RESEARCH AND DEVELOPMENT

Not Applicable

BACKGROUND OF THE INVENTION

This invention is in the field of digital communications and relates to a digital modulation method referred to as Quadrature Amplitude Modulation (QAM). QAM modems can be configured to provide very spectrally efficient transmission and are thus often used in systems where high speed data communications are required over band-limited channels. There are many types of such systems, including fixed point-to-point radio communication links, mobile radio communication links, satellite communication links, and cable communication links.

A QAM signal can be created by amplitude modulating, with user data bits, two RF carriers shifted in phase by 90°, i.e., carriers in quadrature, then combining these carriers to form a composite carrier. When a sequence of 2n data bits, where n is an integer, modulates a QAM modulator, the amplitude vector of the combined carrier signal terminates on one of $2^{2n}$ positions. The $2^{2n}$ positions when graphically represented on a phase plane diagram create what is commonly referred to as a signal point constellation. The commonly applied $2^{2n}$ constellations are square shaped and Gray coded. With Gray coding the digital sequence represented by each signal point in the constellation differs from the digital sequence represented by any immediately adjacent signal point in only one bit position. As a result, any signal point which suffers corruption during transmission and is decoded mistakenly as an adjacent signal point contains only a single bit error.

A problem with a square array of $2^{2n}$ signal points, where n>1, is that the points at the corners of the square have relatively large amplitudes compared to the average amplitude, and hence result in a high peak-to-average power ratio (PAPR) at the modulator output. QAM requires linear amplification if the signal constellation as created is to be preserved. Because of the high PAPR of a square $2^{2n}$ signal point constellation where n>1, the amplifier following the modulator must be operated at an average power level that is lower, by at least the PAPR, than the amplifier's saturation level, i.e., the level at which the amplifier's performance is no longer linear. For a given value of n, where n>1, a non-square $2^{2n}$ signal point constellation, if its PAPR is lower than that of the $2^{2n}$ square signal point constellation, results in a higher achievable average transmitted power level than that achievable with the square signal point constellation. Such a non-square constellation is thus desirable in several system types if it does not deteriorate the receiver's bit-error-rate (BER) versus the ratio of received signal to received noise in bit rate bandwidth ($S/N_b$) performance such that the receiver sensitivity, i.e., the receiver input signal level required for a specified BER, is increased relative to that of the square constellation by as much or more than the increase in the average transmitted power afforded by the non-squared constellation.

In the case of most single carrier systems, a non-square constellation with the above outlined properties is clearly advantageous. In the case of multi-carrier systems, the multicarrier signal PAPR may or may not be strongly correlated with that of the individual sub-carriers PAPR. For example, in OFDMA, the correlation is poor. However, with Discrete Fourier Transform-Spread OFDM (DFT-Spread OFDM), any reduction in the PAPR of the individual sub-carriers results in a reduction of the multicarrier signal PAPR. Further, if the DFT-Spread OFDM sub-carrier mapping is Interleaved FDMA (IFDMA), then the PAPR of the multicarrier signal is reduced to the same value as that of the individual subcarriers, this reduction being the maximum achievable. Thus, for systems employing DFT-Spread OFDM and QAM modulated subcarriers, sub-carriers with non-square $2^{2n}$ signal point constellations having PAPRs lower than those of square $2^{2n}$ point constellations would be highly desirable, provided that any deterioration in the receiver sensitivity is measurably less than the accompanying decrease in PAPR.

BRIEF SUMMARY OF THE INVENTION

The invention provides a method to modify, in a $2^{2n}$-QAM modulator, where n=3, 4, a square signal point constellation to a modified-square signal point constellation, resulting in a PAPR in the modified-square signal point constellation that is less than of the square signal point constellation, while resulting in a deterioration in receiver sensitivity that is less than the decrease in the modulator's PAPR and hence less than the possible improvement at the transmitter in average transmitted power.

DETAILED DESCRIPTION OF THE INVENTION

This invention provides a method of Quadrature Amplitude Modulation (QAM), whereby the QAM signal point constellation, comprising $2^{2n}$ points, where n=3, 4, is arranged in a modified-square array, with $2^{n-2}$ points in each of four quadrants defined by I and Q axes intersecting at an origin of a phase-plane diagram, the signal points in each quadrant of the square array having I and Q relative component amplitudes of 1, 3, 5, ... $2^n-1$ units. According to the present invention, the $2^{2n-2}$ points in each of four quadrants of the square array are modified by relocating to new positions, the inner most $2^{2n-}$ 2/16 constellation points and outer $2^{2n-2}/16$ constellation points including the outermost point and, if n=4, those closest to it, the new positions being close to the adjacent quadrants and resulting in the signal points in each quadrant of the modified-square array having I and Q relative component amplitudes of 1, 3, 5, . . . $2^n$+2n−5 units.

Figure 1:
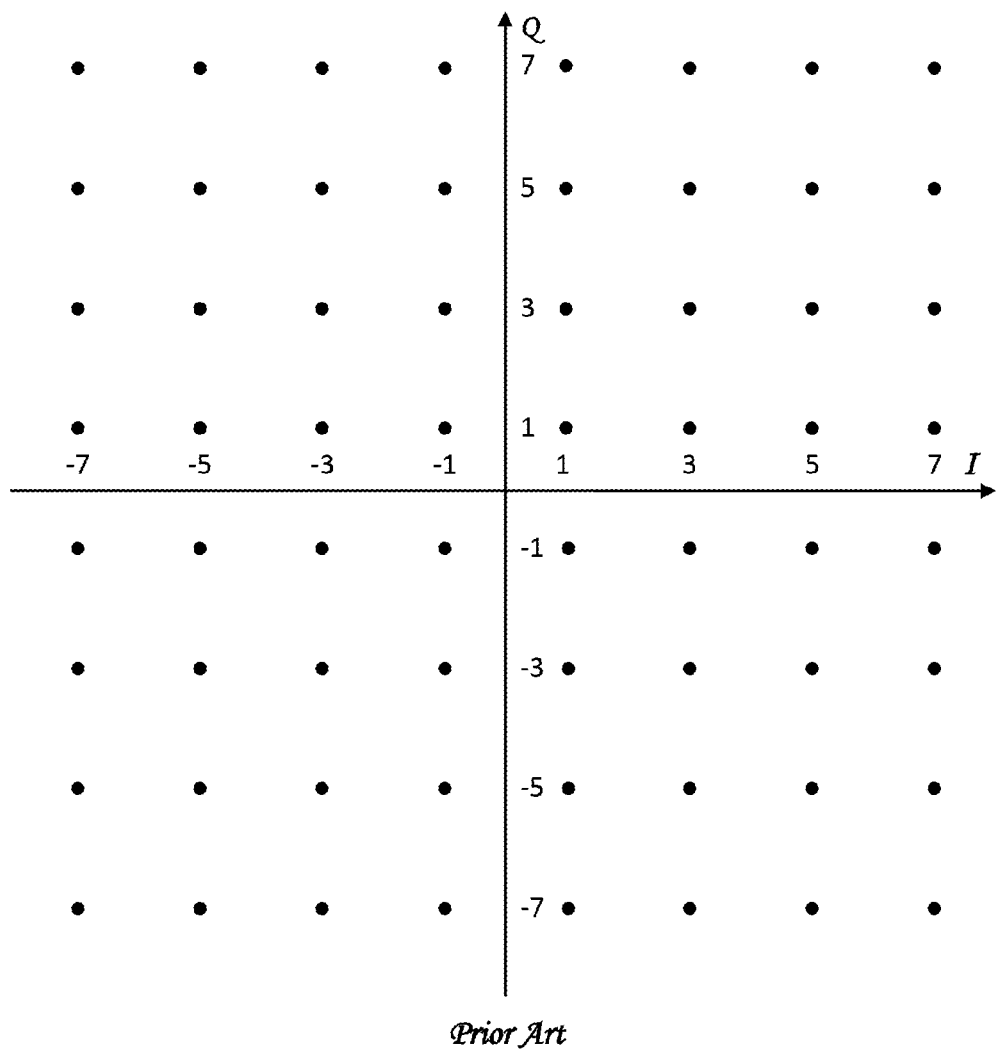
FIG. 1 is a prior art square 64-QAM signal point constellation.

FIG. 1 shows prior art square matrix 64-QAM signal point constellation (n=3). The signal points are represented in a phase plane diagram which shows the relative amplitudes in the In-phase (I) and Quadrature-phase (Q) planes for the signal points.

Figure 2:
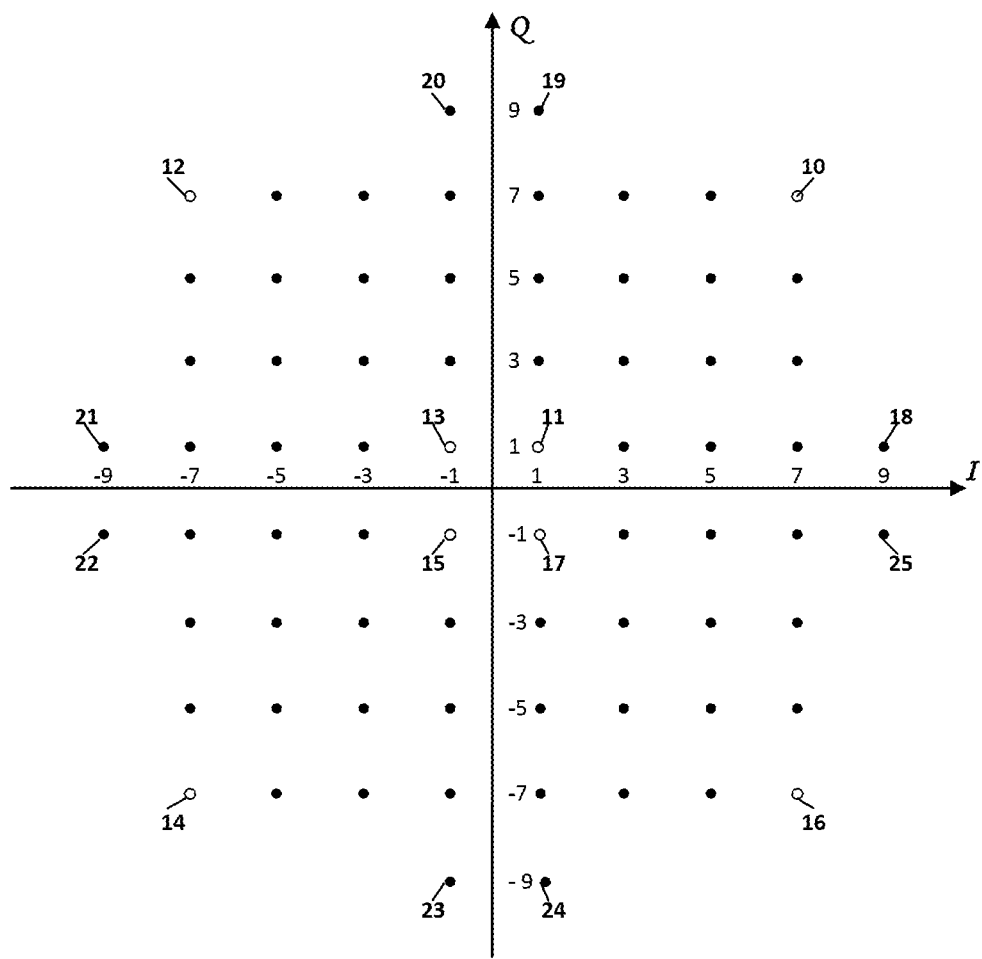
FIG. 2 is a modified-square 64-QAM signal point constellation.

Shown in FIG. 2, according to the present invention, is a modification of the basic square matrix 64-QAM signal point constellation. In this constellation, the signal points 10 to 17 of the square matrix are eliminated and replaced with points 18 to 25.

Figure 3:
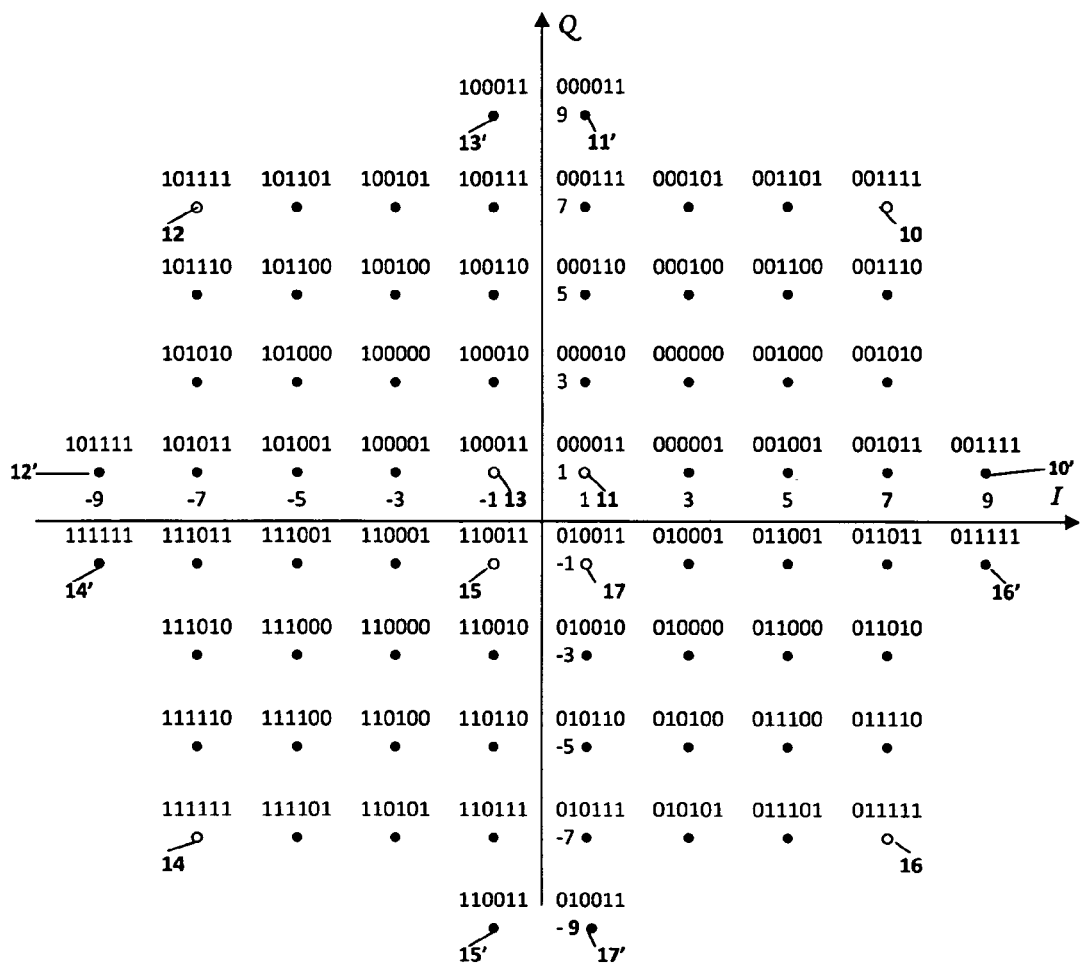
FIG. 3 is a Gray coded, modified-square 64-QAM signal point constellation.

FIG. 3 shows, according to an embodiment of the present invention, the same modification as shown in FIG. 2, but here a) the basic square matrix 64-QAM signal point constellation is Gray coded, b) shown associated with each signal point is the six bit data sequence that generates that point, and c) the eliminated signal points are replaced in a specific fashion. Specifically, the signal points 10 to 17 of the square matrix are relocated to points 10' to 17' respectively, regardless of the specific application of Gray coding. Note that the modified constellation, originally Gray coded when a square, remains Gray coded. Though shown for a specific application of Gray coding, this relationship holds for all applications of Gray coding.

Figure 4:
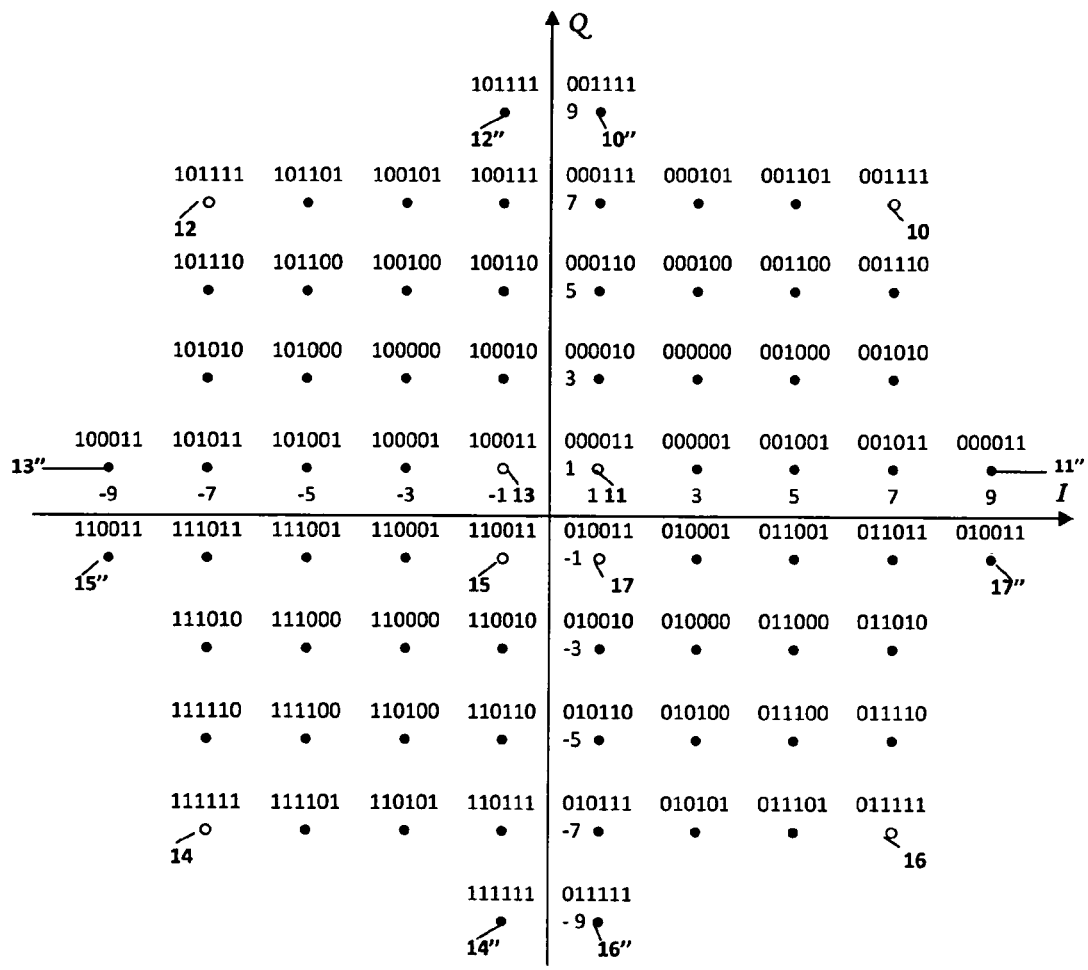
FIG. 4 is a Gray coded, alternate modified-square 64-QAM signal point constellation.

FIG. 4, like FIG. 3, shows, according to an embodiment of the present invention, the same modification as shown in FIG. 2, but here a) the basic square matrix 64-QAM signal point constellation is Gray coded, b) shown associated with each signal point is the six bit data sequence that generated that point, and c) the eliminated signal points are replaced in a specific fashion, but different to that indicated in FIG. 3. Specifically, the signal points 10 to 17 of the square matrix are relocated to points 10" to 17" respectively, regardless of the specific application of Gray coding. Note that the modified constellation, originally Gray coded when a square, remains Gray coded. Though shown for a specific application of Gray coding, this relationship holds for all applications of Gray coding.

Figure 5:
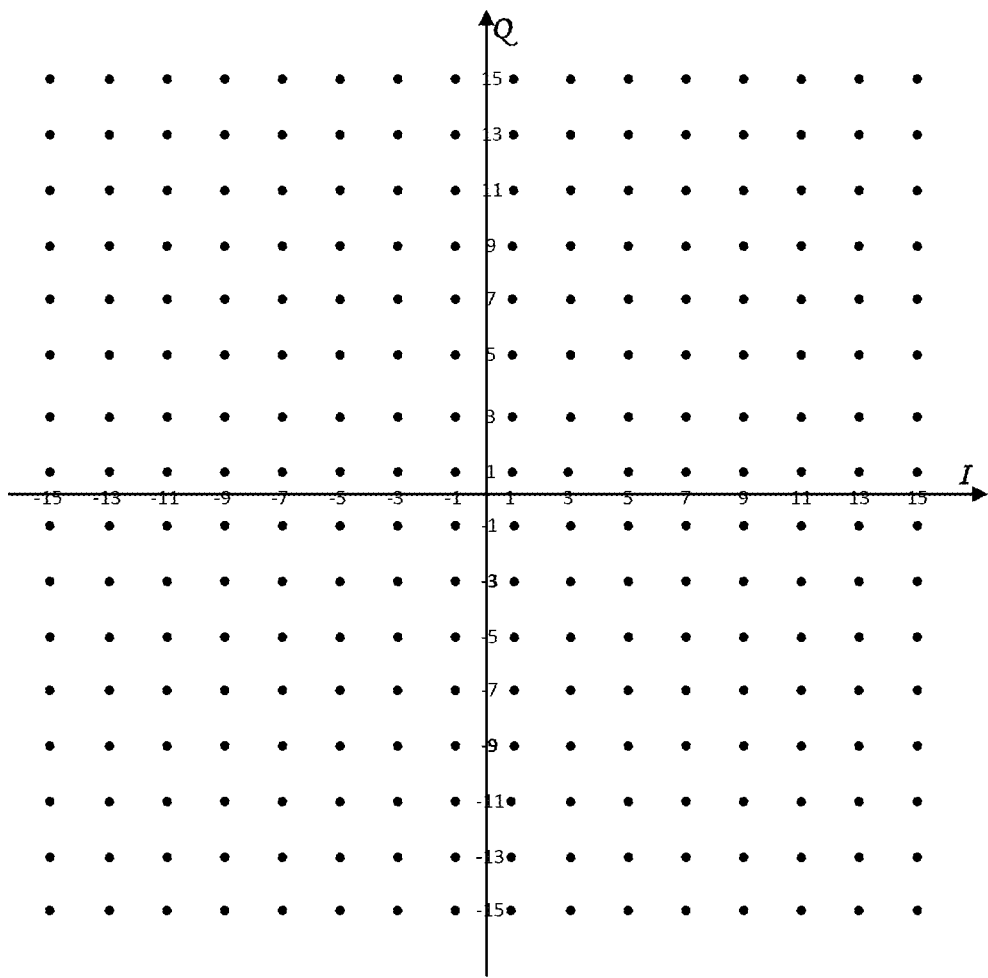
FIG. 5 is a prior art square 256-QAM signal point constellation.

FIG. 5 shows prior art square matrix 256-QAM signal point constellation (n=4). The signal points are represented in a phase plane diagram which shows the relative amplitudes in the In-phase (I) and Quadrature-phase (Q) planes for the signal points.

Figure 6:
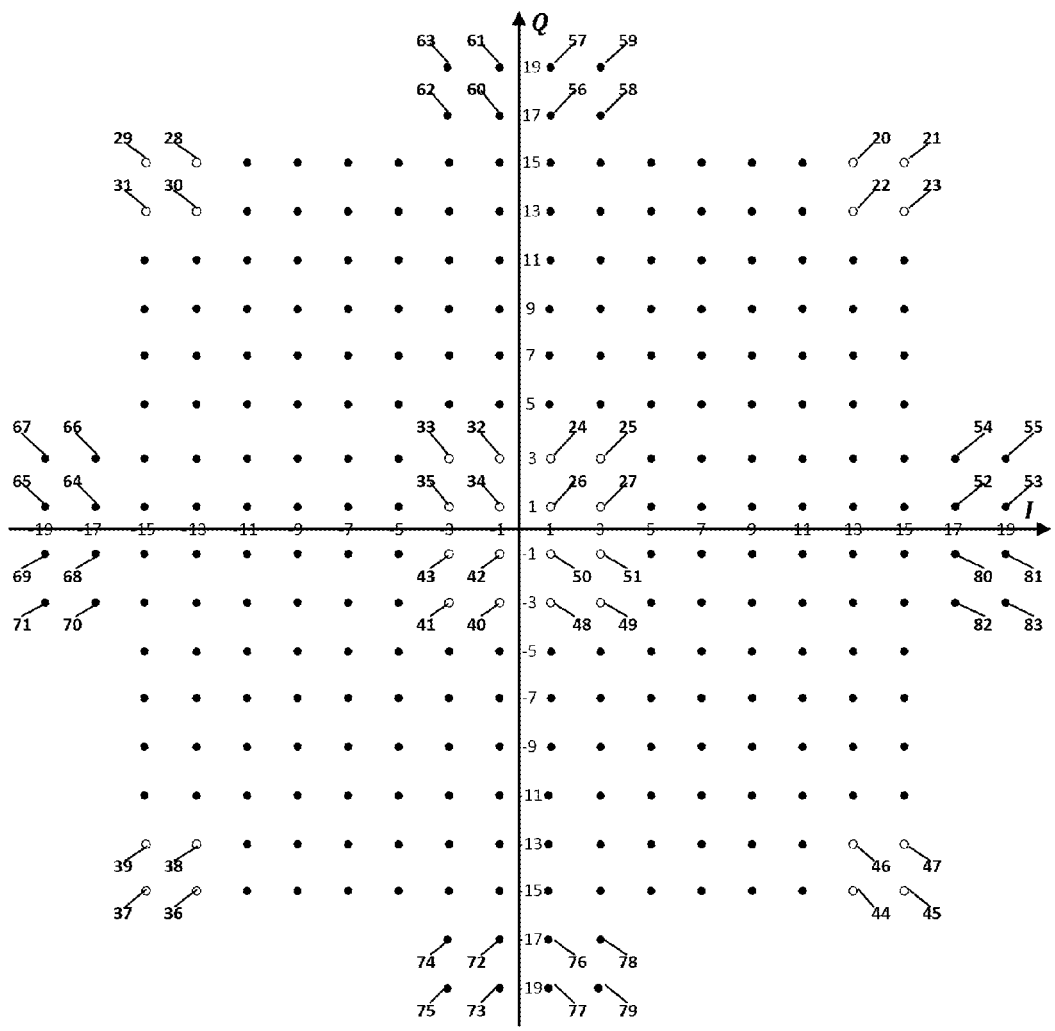
FIG. 6 is a modified-square 256-QAM signal point constellation.

Shown in FIG. 6, according to the present invention, is a modification of the basic square matrix 256-QAM signal point constellation. In this constellation, the signal points 20 to 51 of the square matrix are eliminated and replaced with points 52 to 83.

Figure 7:
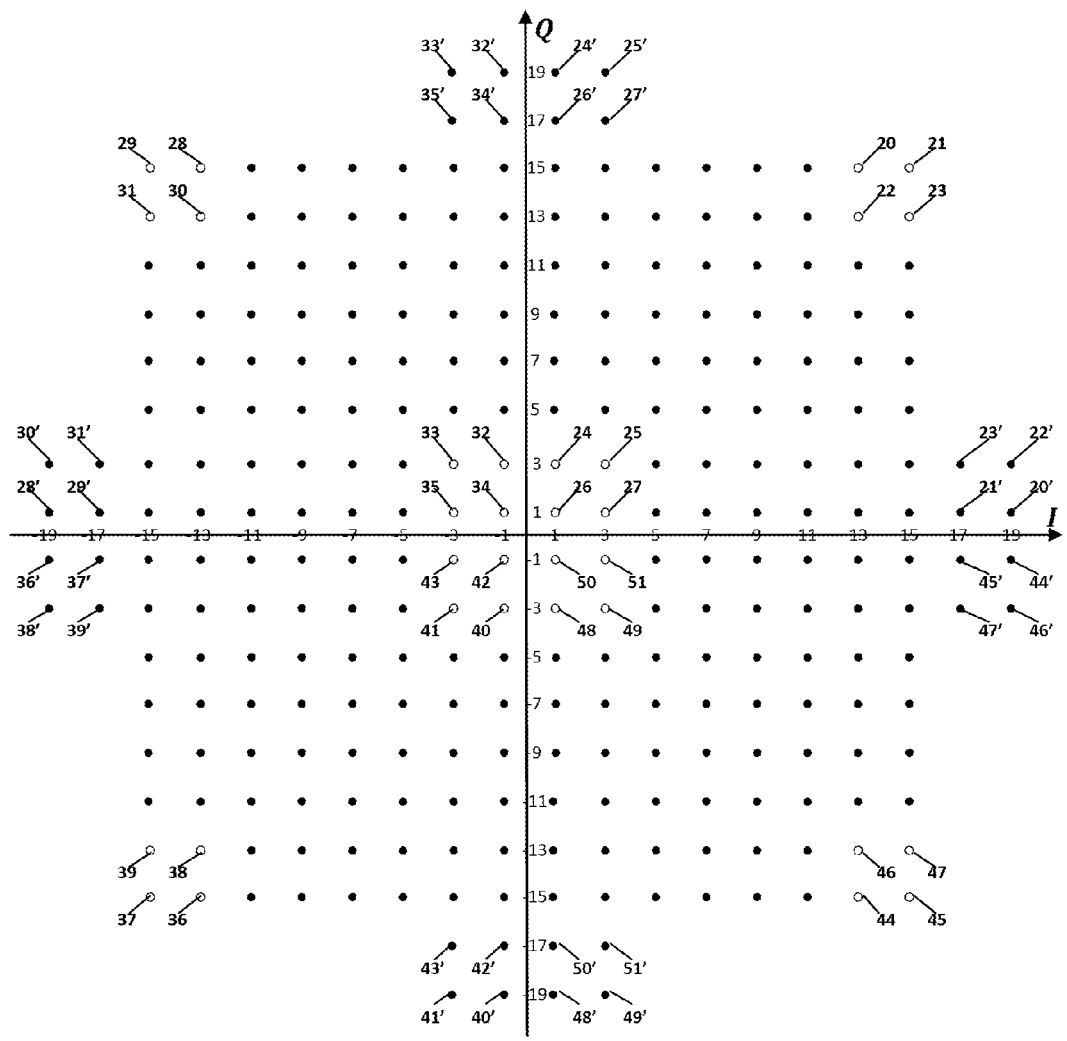
FIG. 7 is a Gray coded, modified-square 256-QAM signal point constellation.

FIG. 7 shows, according to an embodiment of the present invention, the same modification as shown in FIG. 6, but here the basic square matrix 256-QAM signal point constellation is assumed to be Gray coded, and the eliminated signal points are replaced in a specific fashion. Specifically, the signal points 20 to 51 of the square matrix are relocated to points 20' to 51' respectively, regardless of the specific application of Gray coding. With the modification carried out in this fashion, the modified constellation, if originally Gray coded when a square, remains Gray coded.

Figure 8:
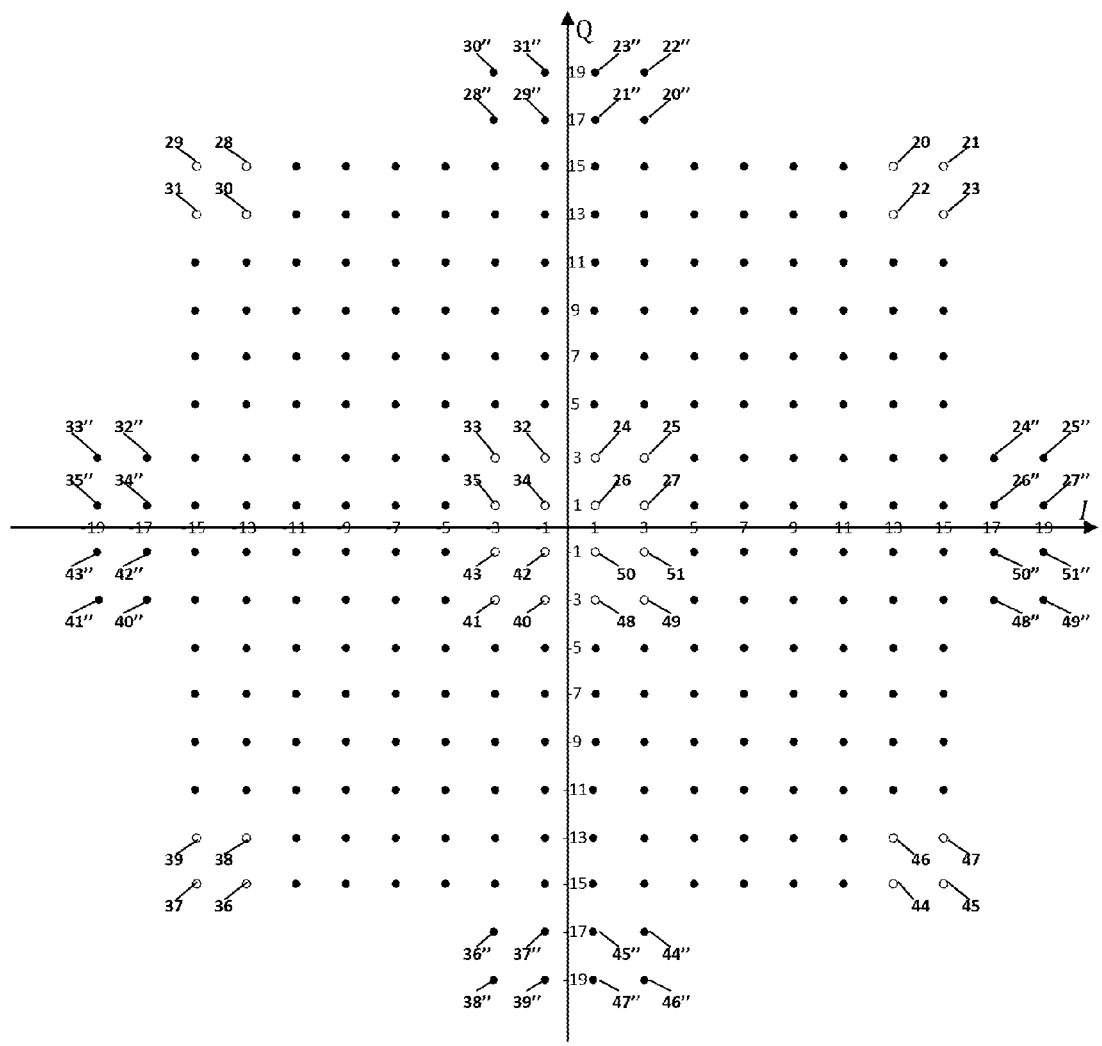
FIG. 8 is a Gray coded, alternate modified-square 256-QAM signal point constellation.

FIG. 8, like FIG. 7, shows, according to an embodiment of the present invention, the same modification as shown in FIG. 6, but here the basic square matrix 64-QAM signal point constellation is assumed to be Gray coded, and the eliminated signal points are replaced in a specific fashion, but different to that indicated in FIG. 7. Specifically, the signal points 20 to 51 of the square matrix are relocated to points 20" to 51" respectively, regardless of the specific application of Gray coding. With the modification carried out in this fashion, the modified constellation, if originally Gray coded when a square, remains Gray coded.

Many methods of mapping of data bits sequences to specified signal points such as the signal points in the positions shown in FIGS. 1 through 8 are known to those of ordinary skill in the art.

Figure 9:
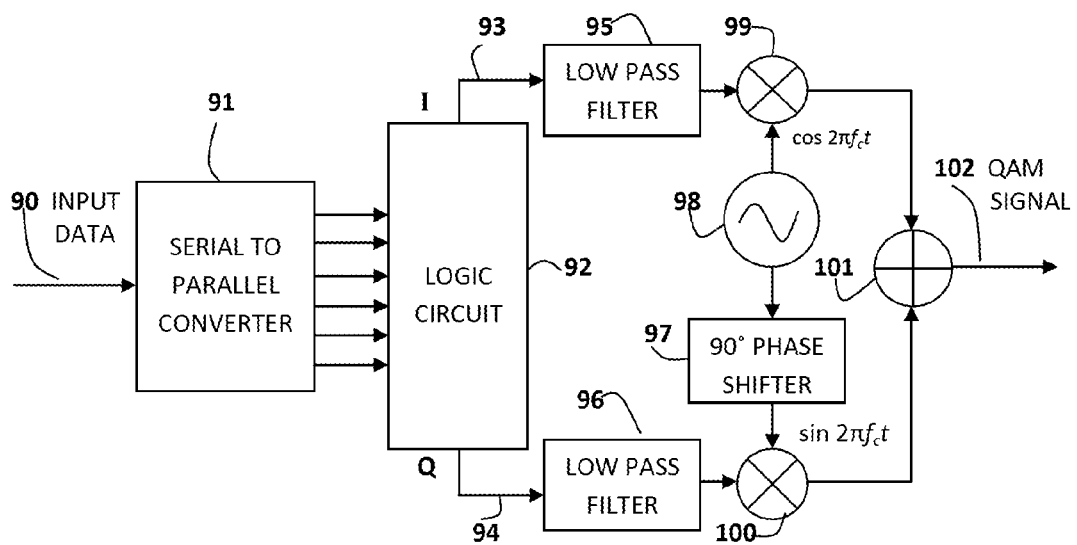
FIG. 9 is a typical prior art modulation method to generate the constellations in FIG. 1, 2, 3 or 4.

A method of 64-QAM modulator mapping using a logic circuit to generate the constellations shown in FIGS. 1, 2, 3 and 4 is shown in FIG. 9 which is a block diagram of a prior art QAM modulator circuit. According to FIG. 9, a data signal 90 to be modulated is inputted to a serial to parallel converter 91 which outputs six parallel data streams that are inputted to a logic circuit 92. The logic circuit 92 knows, for any given six-bit input sequence, what is the corresponding constellation point. With this knowledge, it produces, for any given six-bit input sequence, an in-phase output signal 93, and a quadrature-phase output signal 94, of amplitudes that correspond to the associated signal constellation point. Logic circuit 92 output signals 93 and 94 are fed to low pass filters 95 and 96 respectively which create the desired frequency shape of the QAM signal. The outputs of low pass filters 95 and 96 in turn are fed to multipliers 99 and 100 respectively. The output of oscillator 98 feeds multiplier 99 directly, and multiplier 100 via a 90° phase shifter 97. The pulse amplitude modulated data carriers from multipliers 99 and 100 feed a summing circuit 101 which combines these carriers to produce the desired QAM signal 102.

Another method of QAM modulator mapping is via mapping of data bit sequences to complex numbers followed by one or more of the following: Inverse Discrete Fourier Transform (IDFT) processing, Discrete Fourier Transform (DFT) processing, Inverse Fast Fourier Transform (IFFT) processing, Fast Fourier Transform (FFT) processing.

The mapping of data bit sequences to the modified-square signal point constellations indicated in FIGS. 2, 3, 4, 6, 7 and 8 is applicable to single carrier transmission as well as multi-carrier transmission such as Orthogonal Frequency Division Multiplexing (OFDM), Orthogonal Frequency Division Multiple Access (OFDMA), and Discrete Fourier Transform-Spread OFDM (DFT-Spread OFDM).

The modified-square $2^{2n}$ signal point constellation, where n=3, 4, according to the present invention, results in a PAPR that is less than that achieved with the commonly used square $2^{2n}$ signal point constellation.

For the 64-point constellation shown in FIG. 1 created via unfiltered non-return-to-zero (NRZ) modulating data sequences, the PAPR is 2.34 (3.69 dB). For the constellations shown in FIGS. 2, 3 and 4 created via unfiltered NRZ modulating data sequences, the PAPR is 1.78 (2.50 dB). The modified-square 64-QAM constellation thus results in a 1.19 dB reduction in PAPR when compared to the commonly used square 64-QAM constellation, given unfiltered NRZ modulating data streams. Note that the PAPR of a 16-QAM square constellation with unfiltered NRZ modulating data sequences is 1.8 (2.55 dB), essentially identical to that of the modified-square 64-QAM constellations shown in FIGS. 2, 3 and 4 created via unfiltered NRZ modulating data sequences.

For the 256-point constellation shown in FIG. 5 created via unfiltered NRZ modulating data streams, the PAPR is 2.65 (4.23 dB). For the constellations shown in FIGS. 6, 7 and 8 created via unfiltered NRZ modulating data sequences, the PAPR is 1.99 (2.99 dB). The modified-square 256-QAM constellation thus results in a 1.24 dB reduction in PAPR when compared to the commonly used square 256-QAM constellation created via unfiltered NRZ modulating data sequences.

In a QAM system, best symbol and hence bit error rate performance is achieved when, for a given average power, the signal points in the constellation diagram are spaced as far apart from each other as possible, thus maximizing their noise immunity. With the modified-square constellations according to the present invention, the signal points, on average, are spaced slightly closer together than those of their associated square constellations, for a given average signal power. As a result, the symbol and hence bit error rate performances of these modified-square constellations are slightly degraded relative to their associated square constellations.

For 64-QAM with a Gray coded square array constellation, the probability of bit error, $P_{be(64-QAM)S}$, is shown in the text "Fixed Broadband Wireless communications", Prentice Hall, 2004, by Douglas H. Morais, to be given by:

$$P_{be(64-QAM)S} = \frac{7}{12} Q \left[ \frac{2}{7} \frac{S}{N_b} \right]^{\frac{1}{2}}$$

Where S is the receiver input power, and $N_b$ is the received Gaussian noise in the bit rate bandwidth. For 64-QAM with a Gray coded modified-square array constellation, as indicated in either FIG. 3 or 4, the probability of bit error, $P_{be(64-QAM)MS}$, is computed by the inventor to be:

$$P_{be(64-QAM)MS} = \frac{13}{24} Q \left[ \frac{6}{23} \frac{S}{N_b} \right]^{\frac{1}{2}}$$

What the above results indicate is that with Gary coding, for a given bit rate, a given bit error rate, and when the constellation is a modified-square as embodied in this invention, the required received signal level is approximately 0.35 dB more than that required when the constellation is square. Given this degradation in receiver performance, use of the modified-square constellation in a 64-QAM system results in a net system gain improvement of 0.84 dB (1.19 dB-0.35 dB) over a 64-QAM system using a square, Gray coded constellation, and possibly a slightly different improvement if the square constellation is not Gray coded.

For 256-QAM, with a Gray coded square array constellation, the probability of bit error, $P_{be(256-QAM)S}$, is shown in the text "Fixed Broadband Wireless communications", Prentice Hall, 2004, by Douglas H. Morais, to be given by:

$$P_{be(256-QAM)S} = \frac{15}{32} Q \left[ \frac{8}{85} \frac{S}{N_b} \right]^{\frac{1}{2}}$$

For 256-QAM, with a Gray coded modified-square array constellation as indicated in either FIG. 7 or 8, the probability of bit error, $P_{be(256-QAM)MS}$, is computed by the inventor to be:

$$P_{be(256-QAM)MS} = \frac{29}{64} Q \left[ \frac{8}{93} \frac{S}{N_b} \right]^{\frac{1}{2}}$$

What the above results indicated is that with Gary coding, for a given bit rate, a given bit error rate, and when the constellation is a modified-square as embodied in this invention, the required received signal level is approximately 0.37 dB more than that required when the constellation is square. Given this degradation in receiver performance, use of the modified-square constellation in a 256-QAM system results in a net system gain improvement of 0.87 dB (1.24 dB-0.37 dB) over a 256-QAM system using a square, Gray coded constellation, and possibly a slightly different improvement if the square constellation is not Gray coded.

Although the present invention has been described with respect to specific exemplary embodiments, it should be understood that various changes and modifications to these embodiments may become apparent to those skilled in the art once the above disclosure is fully comprehended. For example, the general principles outlined can be applied to the case where n equals 5, i.e., 1024-QAM. It is intended that the following claims be interpreted to include all such variations and modifications.

What is claimed is:

1. A method of Quadrature Amplitude Modulation (QAM), comprising:

creating a QAM signal point constellation, the QAM signal point constellation comprising 64 points, arranged in a square array with 16 points in each of four quadrants defined by I and Q axes intersecting at an origin of a phase-plane diagram, the signal points in each quadrant of the square array having I and Q relative component amplitudes of 1, 3, 5, and 7 units;

modifying the square array by eliminating an inner most 4 constellation points, located at the complex positions 1+1j, −1+1j, −1−1j and 1−1j, and an outer most 4 constellation points, located at the complex positions 7+7j, −7+7j, −7−7j and 7−7j;

replacing the inner most 4 constellation points and the outer most 4 constellation points with new constellation points located at the complex positions 9+1j, 1+9j, −1+9j, −9+1j, −9−1j, −1−9j, 1−9j and 9−1j; and resulting in the signal points in ach quadrant of the a modified-square array with 16 points in each of four quadrants defined by I and Q axes intersecting at an origin of a phase-plane diagram, the signal points in each quadrant of the modified-square array having I and Q relative component amplitudes of 1, 3, 5, 7, and 9 units.

2. The method of claim 1, further comprising:

mapping a different 6 bit data sequence to each of the 64 constellation points of the square array resulting in a Gray coded square array;

modifying the Gray coded square array by eliminating the inner most 4 constellation points located at the complex positions 1+1j, −1+1j, −1−1j and 1−1j;

replacing the inner most 4 constellation points with new constellation points, located at 1+9j, −1+9j, −1−9j and 1−9j respectively;

eliminating the outer most 4 constellation points, located at the complex positions 7+7j, −7+7j, −7−7j and 7−7j;

replacing the outer most 4 constellation points with new constellation points located at the complex positions 9+1j, −9+1j, −9−1j and 9−1j respectively; and resulting in a modified-square Gray coded array with 16 points in each of four quadrants defined by I and Q axes intersecting at an origin of a phase-plane diagram, the signal points in each quadrant of the modified-square Gray coded array having I and Q relative component amplitudes of 1, 3, 5, 7, and 9 units.

3. The method of claim 1, further comprising:

mapping a different 6 bit data sequence to each of the 64 constellation points of the square array resulting a Gray coded square array;

modifying the Gray coded square array by eliminating the inner most 4 constellation points located at the complex positions 1+1j, −1+1j, −1−1j and 1−1j;

replacing the inner most 4 constellation points with new constellation points, located at 9+1j, −9+1j, −9−1j and 9−1j respectively;

eliminating the outer most 4 constellation points, located at the complex positions 7+7j, −7+7j, −7−7j and 7−7j;

replacing the outer most 4 constellation points with new constellation points located at the complex positions 1+9j, −1+9j, −1−9j and 1−9j respectively; and resulting in a modified-square Gray coded array with 16 points in each of four quadrants defined by I and Q axes intersecting at an origin of a phase-plane diagram, the signal points in each quadrant of the modified-square Gray coded array having I and Q relative component amplitudes of 1, 3, 5, 7, and 9 units.

4. A method of Quadrature Amplitude Modulation (QAM), comprising:

creating a QAM signal point constellation, the QAM signal point constellation comprising 256 points, arranged in a square array with 64 points in each of four quadrants defined by I and Q axes intersecting at an origin of a phase-plane diagram, the signal points in each quadrant of the square array having I and Q relative component amplitudes of 1, 3, 5, 7, 9, 11, 13, and 15 units;

modifying the square array by eliminating an inner most 16 constellation points, located at the complex positions 1+3j, 3+3j, 1+1j, 3+1j, −1+3j, −3+3j, −1+1j, −3+1j, −1−3j, −3−3j, −1−1j, −3−1j, 1−3j, 3−3j, 1−1j and 3−1j, and an outer 16 constellation points, located at the complex positions 13+15j, 15+15j, 13+13j, 15+13j, −13+15j, −15+15j, −13+13j, −15+13j, −13−15j, −15−15j, −13−13j, −15−13j, 13−15j, 15−15j, 13−13j and 15−13j;

replacing the inner most 16 constellation points and the outer 16 constellation points with new constellation points located at the complex positions 17+1j, 19+1j, 17+3j, 19+3j, 1+17j, 1+19j, 3+17j, 3+19j, −1+17j, −1+19j, −3+17j, −3+19j, −17+1j, −19+1j, −17+3j, −19+3j, −17−1j, −19−1j, −17−3j, −19−3j, −1−17j, −1−19j, −3−17j, −3−19j, 1−17j, 1−19j, 3−17j, 3−19j, 17−1j, 19−1j, 17−3j and 19−3j;

resulting in a modified-square array with 64 points in each of four quadrants defined by I and Q axes intersecting at an origin of a phase-plane diagram, the signal points in each quadrant of the modified-square array having I and Q relative component amplitudes of 1, 3, 5, 7, 9, 11, 13, 15, 17, and 19 units.

5. The method of claim 4, further comprising:

mapping a different 8 bit data sequence to each of the 256 constellation points of the square array resulting in a Gray coded square array;

modifying the Gray coded square array by eliminating the inner most 16 constellation points located at the complex positions 1+3j, 3+3j, 1+1j, 3+1j, −1+3j, −3+3j, −1+1j, −3+1j, −1−3j, −3−3j, −1−1j, −3−1j, 1−3j, 3−3j, 1−1j and 3−1j;

replacing the inner most 16 constellation points with new constellation points, located at complex positions 1+19j, 3+19j, 1+17j, 3+17j, −1+19j, −3+19j, −1+17j, −3+17j, −1−19j, −3−19j, −1−17j, −3−17j, 1−19j, 3−19j, 1−17j and 3−17j, respectively;

eliminating the outer 16 constellation points, located at the complex positions 13+15j, 15+15j, 13+13j, 15+13j, −13+15j, −15+15j, −13+13j, −15+13j, −13−15j, −15−15j, −13−13j, −15−13j, 13−15j, 15−15j, 13−13j and 15−13j;

replacing the outer 16 constellation points with new constellation points located at the complex positions 19+1j, 17+1j, 19+3j, 17+3j, −19+1j, −17+1j, −19+3j, −17+3j, −19−1j, −17−1j, −19−3j, −17−3j, 19−1j, 17−1j, 19−3j and 17−3j, respectively; and resulting in a modified-square Gray coded array with 64 points in each of four quadrants defined by I and Q axes intersecting at an origin of a phase-plane diagram, the signal points in each quadrant of the modified-square Gray coded array having I and Q relative component amplitudes of 1, 3, 5, 7, 9, 11, 13, 15, 17, and 19 units.

6. The method of claim 4, further comprising:

mapping a different 8 bit data sequence to each of the 256 constellation points of the square array resulting in a Gray coded square array;

modifying the Gray coded square array by eliminating the inner most 16 constellation points located at the complex positions 1+3j, 3+3j, 1+1j, 3+1j, −1+3j, −3+3j, −1+1j, −3+1j, −1−3j, −3−3j, −1−1j, −3−1j, 1−3j, 3−3j, 1−1j and 3−1j;

replacing the inner most 16 constellation points with new constellation points, located at complex positions 17+3j, 19+3j, 17+1j, 19+1j, −17+3j, −19+3j, −17+1j, −19+1j, −17−3j, −19−3j, −17−1j, −19−1j, 17−3j, 19−3j, 17−1j and 19−1j, respectively;

eliminating the outer 16 constellation points, located at the complex positions 13+15j, 15+15j, 13+13j, 15+13j, −13+15j, −15+15j, −13+13j, −15+13j, −13−15j, −15−15j, −13−13j, −15−13j, 13−15j, 15−15j, 13−13j and 15−13j; and replacing the outer 16 constellation points with new constellation points located at the complex positions 3+17j, 1+17j, 3+19j, 1+19j, −3+17j, −1+17j, −3+19j, −1+19j, −3−17j, −1−17j, −3−19j, −1−19j, 3−17j, 1−17j, 3−19j and 1−19j, respectively; and resulting in a modified-square Gray coded array with 64 points in each of four quadrants defined by I and Q axes intersecting at an origin of a phase-plane diagram, the signal points in each quadrant of the modified-square Gray coded array having I and Q relative component amplitudes of 1, 3, 5, 7, 9, 11, 13, 15, 17, and 19 units.

* * * * *